(12) United States Patent
Marioni

(10) Patent No.: US 6,591,676 B2
(45) Date of Patent: Jul. 15, 2003

(54) DEVICE FOR DETECTING THE LEVEL OF LIQUID, PARTICULARLY FOR SUBMERSED PUMPS

(75) Inventor: Elio Marioni, Dueville (IT)

(73) Assignee: Askoll Holding S.r.l., Dueville (IT)

( * ) Notice: Subject to any disclaimer, the term of this patent is extended or adjusted under 35 U.S.C. 154(b) by 58 days.

(21) Appl. No.: 09/959,343

(22) PCT Filed: Feb. 28, 2001

(86) PCT No.: PCT/EP01/02256
§ 371 (c)(1),
(2), (4) Date: Oct. 23, 2001

(87) PCT Pub. No.: WO01/67054
PCT Pub. Date: Sep. 13, 2001

(65) Prior Publication Data
US 2002/0157465 A1 Oct. 31, 2002

(30) Foreign Application Priority Data
Mar. 8, 2000 (IT) .......................... PD00A0058

(51) Int. Cl.⁷ .......................... G01F 23/60; G01F 23/00; G01F 21/00; F04B 49/04; F04B 49/06
(52) U.S. Cl. .......................... 73/313; 73/304; 340/623; 417/40; 417/44.1
(58) Field of Search .......................... 73/301, 303, 313, 73/304 C; 340/612, 623; 250/430; 116/229; 417/40, 44.1

(56) References Cited

U.S. PATENT DOCUMENTS

| 3,553,575 | A | * | 1/1971 | Shea | 324/61 |
| 4,053,398 | A | * | 10/1977 | Venema | 210/41 |
| 4,091,671 | A | | 5/1978 | McLees | |
| 5,856,783 | A | | 1/1999 | Gibb | |
| 6,203,281 | B1 | * | 3/2001 | Gurega | 417/40 |

FOREIGN PATENT DOCUMENTS

DE       198 02 227       9/1998

* cited by examiner

Primary Examiner—Helen Kwok
Assistant Examiner—Katrina Wilson
(74) Attorney, Agent, or Firm—Guido Modiano; Albert Josif; Daniel O'Byrne

(57) ABSTRACT

A liquid level detection device (10), particularly for submersed pumps, characterized in that it comprises means (13, 14) for detecting variation of electric and/or magnetic field in relation to the variation of the level of the liquid; the means are associated with a controller (16) for switching on and off a submersed pump (12).

7 Claims, 3 Drawing Sheets

DEVICE FOR DETECTING THE LEVEL OF LIQUID, PARTICULARLY FOR SUBMERSED PUMPS

TECHNICAL FIELD

The present invention relates to a device for detecting the level of liquid, particularly for submersed pumps.

BACKGROUND ART

The most frequent application of submersed pumps is the emptying of traps or the like to remove an excessive amount of liquids that gradually accumulates.

A typical case is the emptying of drainage traps and of water accumulated in excavations in building yards.

Submersed pumps usually have liquid level detection devices which allow to operate the pump when the level of the liquid exceeds a maximum value and to stop its operation if the level of the liquid reaches a minimum value.

Conventional liquid level detection devices are substantially constituted by appendages which protrude out of the bulk of the pump with end floats and which, by being affected by the rise or fall of the level of liquid, activate electrical connections.

Conventional detection devices are not free from drawbacks.

As mentioned, these devices in fact protrude out of the bulk of the pumps; accordingly, the trap or room from which the liquid is to be removed must be larger than the dimensions of the pump associated with the detection device.

Moreover, the correct operation of these devices also depends on the presence or absence of objects floating in the liquid.

The presence of a floating foreign object might in fact alter the detections performed by the device or even damage it.

Sometimes the detections performed by the devices can be altered also as a consequence of a turbulent motion of the liquid.

DISCLOSURE OF THE INVENTION

The aim of the present invention is to eliminate or substantially reduce the problems of conventional liquid level detection devices.

Within this aim, an important object of the invention is to provide a liquid level detection device whose detection cannot be influenced by any turbulent motions of the liquid or by the presence of foreign objects floating in the liquid.

Another object of the invention is to provide a detection device which is contained within the dimensions of the pump.

Another object of the invention is to provide a device which can detect the level of liquid with a precision which is at least equal to, or higher than, known types of device.

This aim and these and other objects which will become better apparent hereinafter are achieved by a liquid level detection device, particularly for submersed pumps, characterized in that it comprises means for detecting variation of electric and/or magnetic field in relation to the variation of the level of the liquid, said means being associated with a controller for switching on and off a submersed pump.

BRIEF DESCRIPTION OF THE DRAWINGS

Further characteristics and advantages of the present invention will become better apparent from the following detailed description of a preferred but not exclusive embodiment thereof, illustrated only by way of non-limitative example in the accompanying drawings, wherein.

WAYS OF CARRYING OUT THE INVENTION

Figure 1:
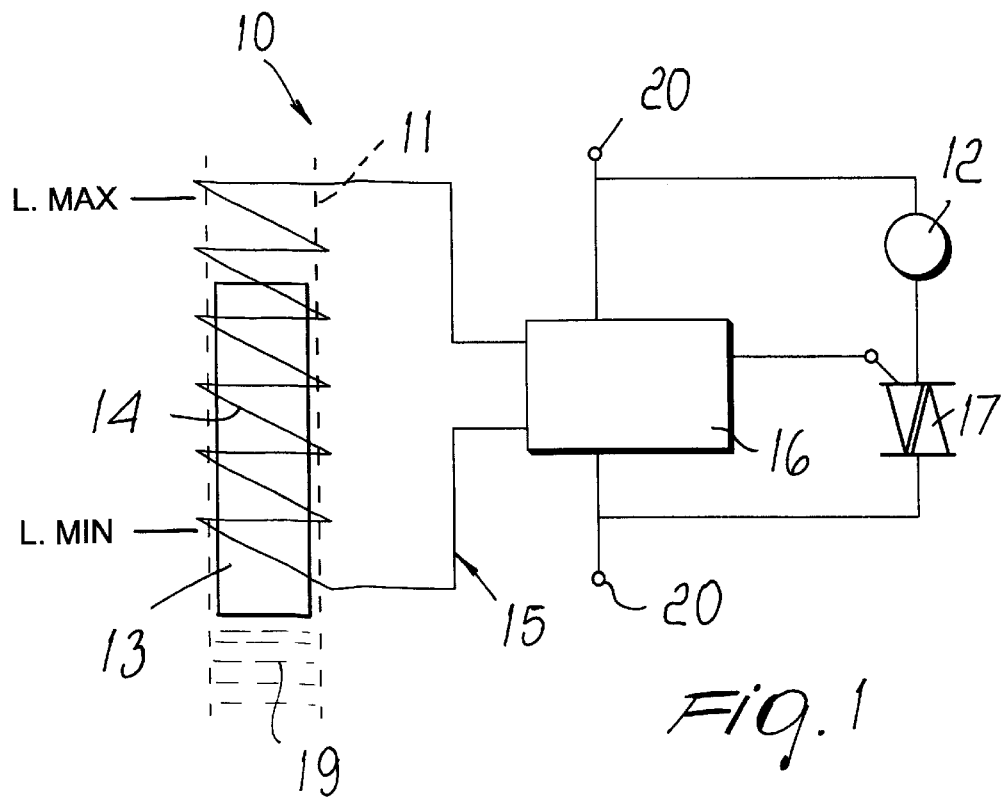
FIG. 1 is a schematic view of a device according to the invention in a first embodiment.

A liquid level detection device according to the invention, in a first embodiment, as shown in FIG. 1, is generally designated by the reference numeral 10.

The device 10 is constituted by a pipe 11 in which the liquid 19 whose level is to be measured is present; the pipe is associated with a submersed pump which is designated by the reference numeral 12 in the figure and is powered by an electric circuit 15.

A float 13 can slide freely inside the pipe 11 and has a core made of ferromagnetic material.

The pipe 11 is provided with a solenoid coil 14 which is part of the electric circuit 15.

The solenoid coil 14 is connected to a controller 16.

Depending on the detected inductance value, the controller 16 drives the operation of the pump 12 by controlling a solid-state switch 17 connected in series to the power supply 20 of the pump 12.

The device 10 utilizes the principle by which when a ferromagnetic material is inserted in the core of a solenoid the value of the detectable inductance varies.

Moreover, if the supply voltage is sinusoidal, the variation of the inductance value is detected even more easily.

In particular, the inductance of the solenoid coil 14 varies considerably when the coil contains, instead of air, which is characterized in that it has a unit value of relative magnetic permeability, a float 13 which is partly made of ferromagnetic material, which has a relative magnetic permeability of more than 10,000 H/m.

Depending on the position of the float 13, the inductance varies from a minimum value to a maximum value.

The float 13 must have such dimensions as to insert in the core of the solenoid 14 the piece of ferromagnetic material as the level of the liquid 19 rises; once the ferromagnetic material occupies the entire length of the solenoid 14, the value of the inductance does not increase.

In practice, a discrimination has been introduced between the power-on value and the power-off value of the pump 12, introducing a hysteresis between two levels of liquid, so as to avoid unpleasant intermittent operation of said pump, with continuous and frequent damaging starting.

More refined forms of operation, with generation of delays, idle times, operating modes which are specific for the type of service, et cetera, can be obtained by providing a more sophisticated controller 16.

Figure 2:
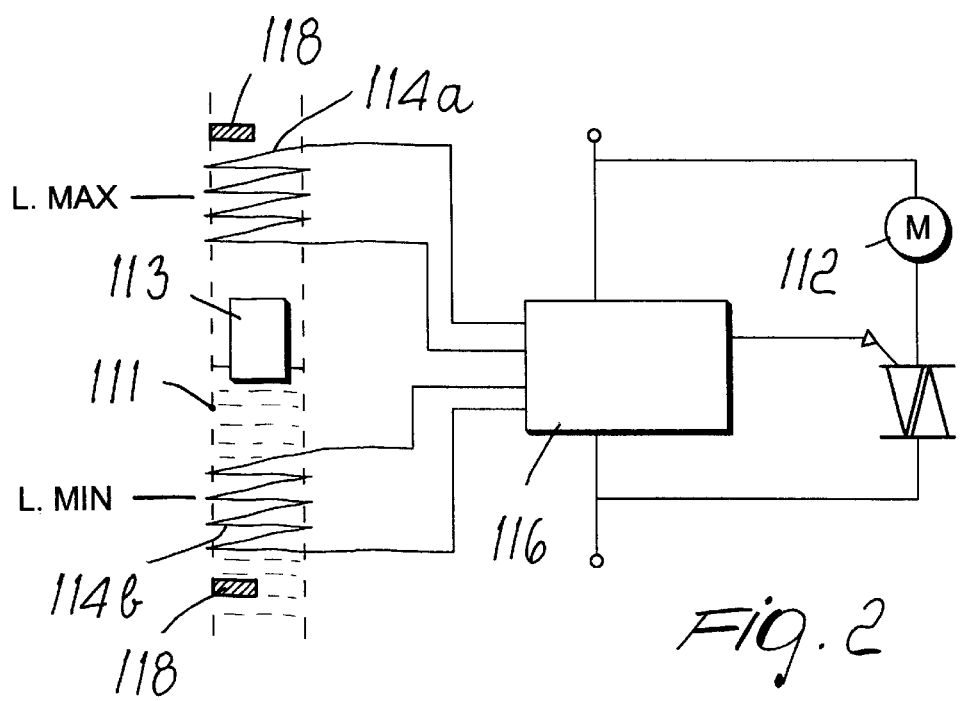
FIG. 2 is a schematic view of a constructive variation of the device of FIG. 1.

If it is difficult to achieve hysteresis of the value of the inductance due to manufacturing reasons related to mechanical bulk or because the hysteresis interval between the power-on and power-off levels is particularly wide, one can resort to the solution shown in FIG. 2.

In this case, two separate solenoid coils 114a and 114b are connected to the controller 116 and a float 113 can slide therein.

The coils 114a and 114b are, in this case also, associated with a pipe 111 which is provided with mechanical retainers 118 for the float 113.

When the float 113, as a consequence of the rise of the level of the liquid, arrives at the upper coil 114a, the corresponding inductance value varies, indicating that a maximum level has been reached.

In this case, the controller 116 must switch on the pump 112.

Likewise, when the float 113, as a consequence of the fall of the level of the liquid, arrives at the lower coil 114b the corresponding inductance value varies, indicating that a minimum level has been reached; at this point the pump 112 must stop running.

An operating hysteresis with two digital sensors, i.e. of the on-off type, has thus been provided instead of providing a single sensor which expresses an analog value.

The complication entailed by doubling the number of coils and floats is certainly offset by the simplification entailed by the provision of on-off sensors and of the corresponding controller with respect to an analog sensor and to the unit for controlling it.

Figure 3:
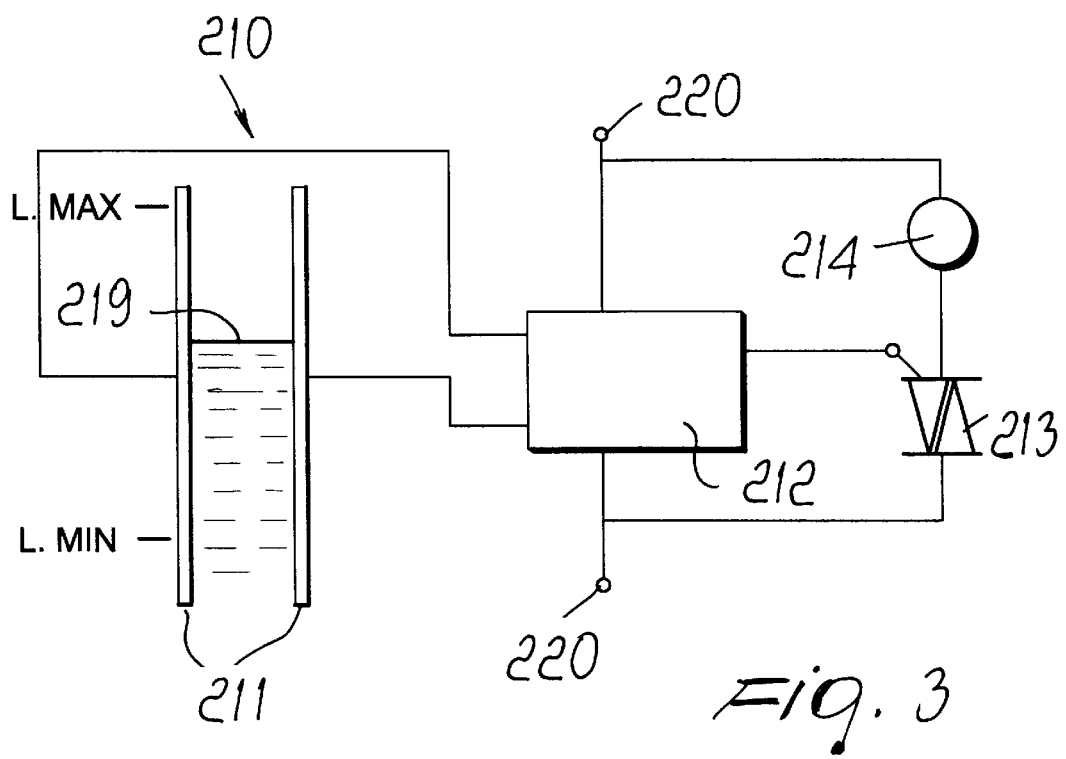
FIG. 3 is a schematic view of a device according to the invention in a second embodiment.

A second embodiment of the device is designated by the reference numeral 210 in FIG. 3.

The device 210 comprises two insulated flat plates 211 between which the liquid 219 whose level is to be measured is present.

This embodiment uses the variation in capacitance that occurs when the material inserted between the plates 211 varies, especially when passing from a material with a dielectric constant of 1, such as air, to a material with a higher dielectric constant of approximately 80, such as water.

In practice, depending of the level of the liquid 219 contained between the two plates 211, particularly from a minimum level to a maximum level, a variation in capacitance from a minimum value to a maximum value is detected.

It is undoubtedly more complicated to detect the capacitance value with respect to the inductance value described earlier, but one has the enormous advantage of not requiring movable mechanical elements, eliminating the associated problems.

The flat plates 211 are connected to a controller 212.

The controller 212 can switch on and off the pump 214 according to the value of the capacitance and therefore according to the level of the liquid by controlling a solid-state switch 213 which is arranged in series to the power supply 220 of the pump.

In this case also, the variation in the value of the capacitance can be such as to allow to introduce a discrimination between the power-on value and the power-off value, introducing a hysteresis between two levels of liquid, so as to avoid unpleasant intermittent operation of the pump 214, with continuous and frequent damaging starting.

By providing a more sophisticated controller 212, it is possible to obtain more refined forms of operation, for example setting delays, idle times, operating modes which are specific for the type of service, et cetera.

Figure 5:
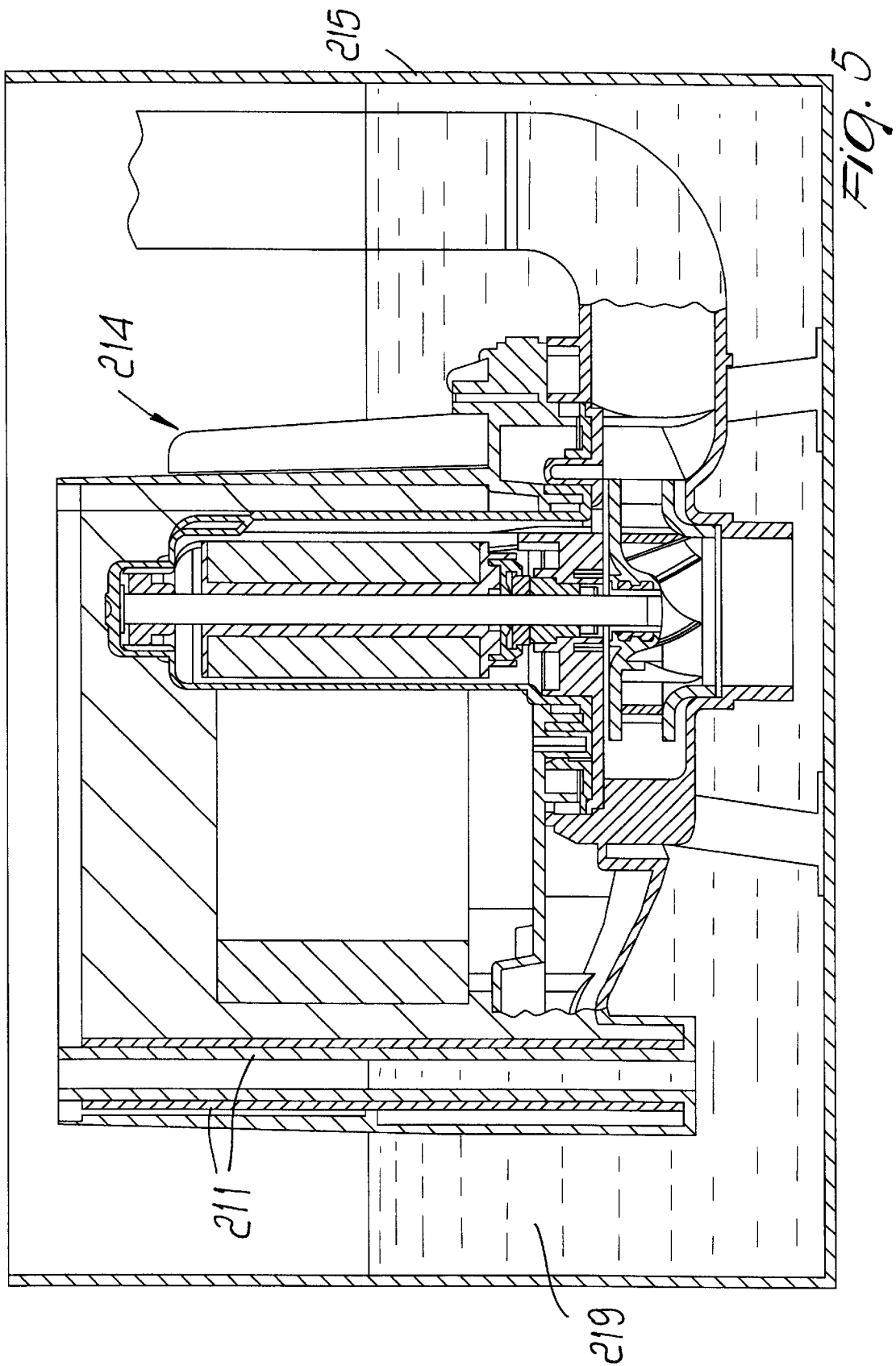
FIG. 5 is a view of the device of FIG. 4 applied to a submersed pump.

The device 210 can be accommodated even more easily in the pump 214, as also shown in FIG. 5, which shows the pump 214 inside a trap 215 which contains the liquid 219.

Figure 4:
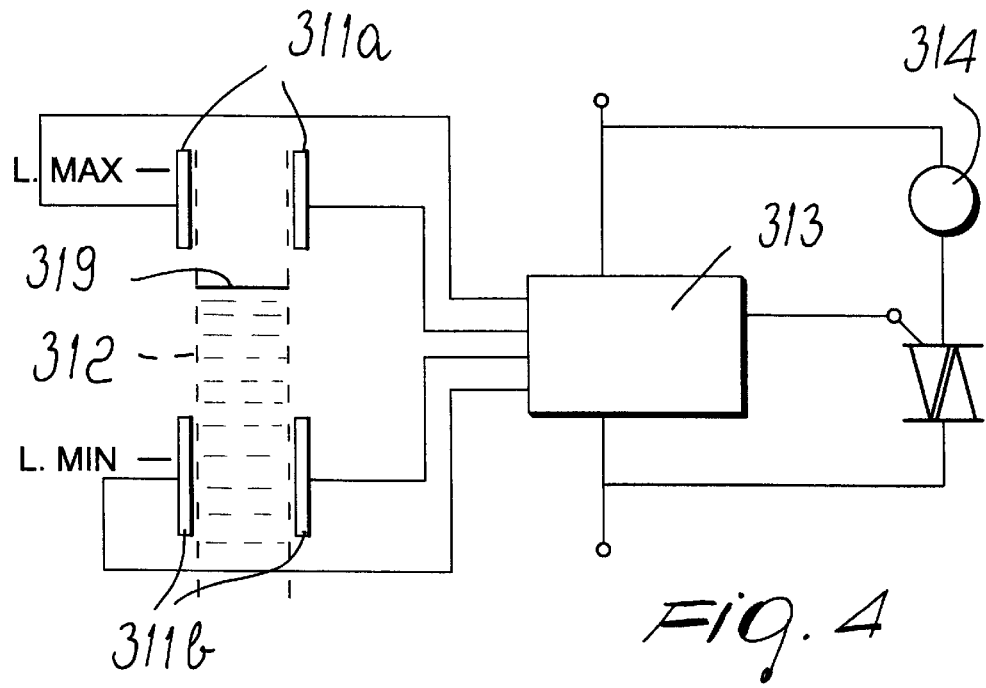
FIG. 4 is a schematic view of a constructive variation of the device of FIG. 3.

If it is difficult to obtain hysteresis of the value of capacitance due to manufacturing reasons related to mechanical bulk, or because the hysteresis interval between the power-on and power-off levels is particularly wide, it is possible to resort to the solution shown in FIG. 4.

In this case there are two pairs of plates 311a and 311b which are arranged at a pipe 312 in which liquid 319 is present.

The plates 311a, arranged in an upward region, indicate that the upper level of the liquid 319 has been reached and that therefore the controller 313 must switch on the pump 314 for emptying.

The plates 311b, arranged in a downward region, instead indicate when it is convenient to stop the pump 314.

An operating hysteresis with two digital sensors, i.e., of the on-off type, has thus been provided instead of providing a single sensor which expresses an analog value.

In this case also, the complication entailed by doubling the number of sensors is certainly offset by the constructive simplification entailed by sensors of the on-off type and by the corresponding controller with respect to an analog sensor and to the logic system for controlling it.

In order to optimize the sizing of the electric circuits for detecting the variation of inductance and capacitance, it is possible to supply said circuits with suitable frequencies, so as to be able to detect impedances whose absolute value is not critical. triacs, but they can be constituted by any solid-state switch.

In practice it has been observed that the present invention has achieved the intended aim and objects.

In particular, a device has been provided which has no external movable appendages and which in one of its embodiments requires no movable mechanical bodies, thus eliminating all the problems of jamming or false indication that can be caused by turbulence or by the presence of solid objects in the liquids in which the level detection devices are usually immersed.

The devices according to the invention can be accommodated inside the enclosure of the pumps.

In this manner it is possible to place submersed pumps which use said devices in traps whose dimensions are almost comparable to the dimensions of the pump proper.

Finally, it should be noted that these devices have a structure by virtue of which there is no conduction of electricity in the liquid, thus avoiding an important drawback.

The present invention is susceptible of numerous modifications and variations, all of which are within the scope of the inventive concept.

All the details may furthermore be replaced with other technically equivalent elements.

In practice, the materials employed, as well as the dimensions, so long as they are compatible with the contingent use, may be any according to requirements.

The disclosures in Italian Patent Application No. PD2000A000058 from which this application claims priority are incorporated herein by reference.

What is clamed is:

1. A liquid level detection device, particularly for submersed pumps, comprising: detection means for detecting variation of an electric and/or magnetic field in relation to a variation of a level of a liquid; a controller for switching on and off a submersed pump connected to said detection means; and wherein said detection means comprises two solenoid coils arranged at different heights at a location where liquid accumulates so as to detect a maximum level and a minimum level of the liquid, and at least one float which is freely slidable within said coils, said at least one float being at least partially made of ferromagnetic material and said coils being connected to said controller.

2. The device of claim 1, further comprising a power supply for powering the submersed pump and a switch connected to said controller, said switch being further connected in series to the power supply.

3. The device according to claim 1, wherein said detection means is accommodated within an enclosure of the submersed pump.

4. The device of claim 1, wherein said ferromagnetic material has a relative magnetic permeability which is higher than 10,000 H/m.

5. The device of claim 1, wherein said detection means further comprises: a pipe at which said solenoid coils are associated, said at least one float being freely slidable inside said pipe; and mechanical retainers provided at said pipe for retaining said float.

6. In a submersed pump accommodated within an enclosure thereof, a liquid level detection device accommodated inside the pump enclosure, the liquid level detection device comprising: a controller for switching on and off the submersed pump; two solenoid coils arranged at different heights at a location where liquid accumulates so as to detect variation of an electric and/or magnetic field in relation to a variation of a level of a liquid between a maximum level and a minimum level, said coils being connected to said controller; and at least one float which is freely slidable within said coils to produce an inductance variation of the coils, said at least one float being at least partially made of ferromagnetic material.

7. In a submersed pump accommodated within an enclosure thereof, a liquid level detection device accommodated inside the pump enclosure, the liquid level detection device comprising: a controller for switching on and off the submersed pump; a pipe arranged in said enclosure so as to be accessible to a liquid whose level has to be measured; two solenoid coils associated at said pipe and arranged at different heights so as to detect variation of an electric and/or magnetic field in relation to a variation of a level of the liquid inside said pipe between a maximum level and a minimum level, said coils being connected to said controller; and at least one float which is freely slidable in said pipe so as to produce an inductance variation of the coils, said at least one float being at least partially made of ferromagnetic material.

* * * * *